United States Patent [19]
Redpath

[11] Patent Number: 5,984,787
[45] Date of Patent: Nov. 16, 1999

[54] METHOD AND SYSTEM FOR MULTI-USER GAME RECOVERY

[75] Inventor: Richard J. Redpath, Cary, N.C.

[73] Assignee: International Business Machines Corp., Armonk, N.Y.

[21] Appl. No.: 08/877,268

[22] Filed: Jun. 17, 1997

[51] Int. Cl.$^6$ ........................................... A63F 9/22
[52] U.S. Cl. ............................................................ 463/42
[58] Field of Search ........................... 463/24, 1, 40–43; 395/181, 182.02, 182.07, 182.12, 182.13, 200.33; 348/10

[56] References Cited

U.S. PATENT DOCUMENTS

| | | | |
|---|---|---|---|
| 5,592,611 | 1/1997 | Midgely et al. | 395/182.02 |
| 5,594,863 | 1/1997 | Stiles | 395/182.13 |

*Primary Examiner*—Jessica J. Harrison
*Assistant Examiner*—Sheila Clayton
*Attorney, Agent, or Firm*—A. Bruce Clay

[57] ABSTRACT

Recovery from a game server termination allows continuation of a multi-user game in a distributed network using a Lobby. The Lobby provides a central place in which users can post a game with a game server address for others to see and join. Users of the game continue to play even if the server should prematurely terminate.

9 Claims, 4 Drawing Sheets

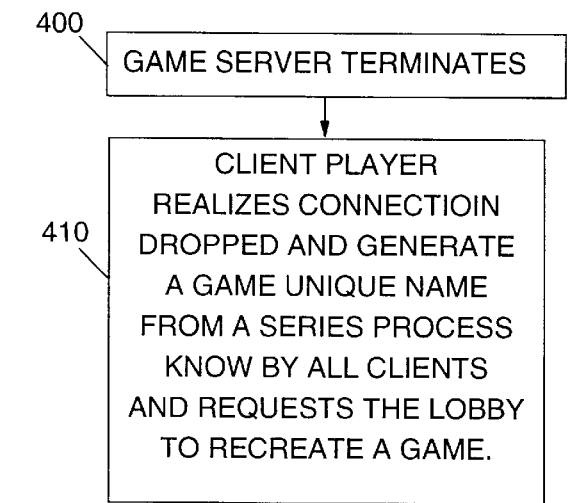
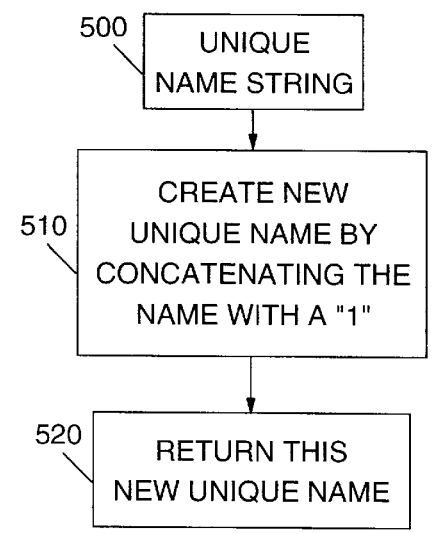
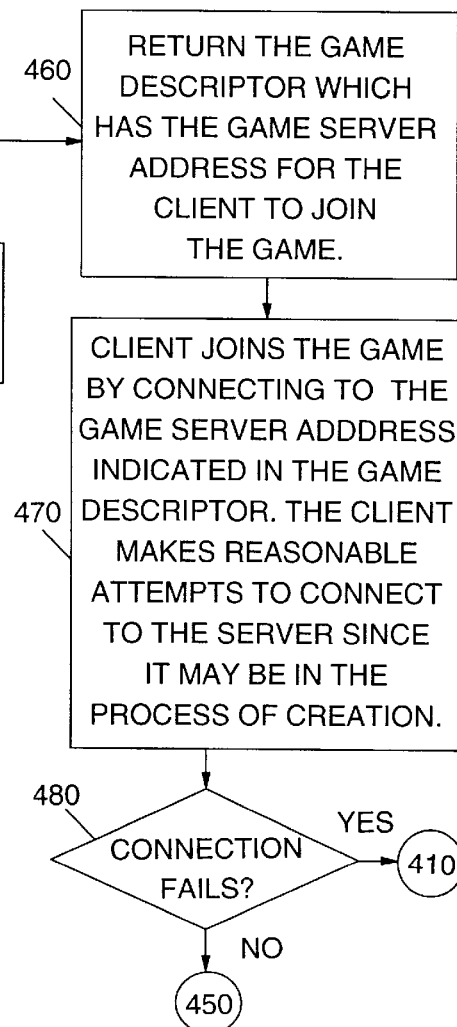

METHOD AND SYSTEM FOR MULTI-USER GAME RECOVERY

FIELD OF THE INVENTION

This invention relates in general to computer software, and in particular to a method and system for recovery from a prematurely terminated multi-user game played over a network service.

BACKGROUND OF THE INVENTION

Prior art that exists today is the proprietary services provided by private and publicly held companies on the Internet such as TEN (Total Entertainment Network) and Blizzard Entertainment. Blizzard Entertainment provides an Internet lobby server called battle net which is a free service to all users that have a CD of the game Diablo. Diablo users can use this service to create a multi-user game over the Internet. Since users have purchased the game, the service is free as compensation. This process does not have a recovery system if the hosting game server should terminate during an active multi-user game. The result is catastrophic termination of the game to all players.

SUMMARY OF THE INVENTION

Accordingly, an object of the present invention is to provide a method for recovery from a game server termination to allow for continuation of a multi-user game in a distributed network using a Lobby. Thus, the overall concept desired is a Lobby in which users can post a game with a game server address at a central place for others to see and join. The present invention as disclosed herein provides a method for users of a game to continue playing even if the server should prematurely terminate.

These and other features, aspects, and advantages of the present invention will become better understood with reference to the following description, appended claims, and accompanying drawings.

BRIEF DESCRIPTION OF THE DRAWINGS

For a more complete understanding of the present invention and for further advantages thereof, reference is now made to the following Detailed Description taken in conjunction with the accompanying drawings, in which:

FIG. 4 is a flow chart for a game player recovery in accordance with the present invention; and FIG. 5 is a flow chart for a process to create a series of unique game names.

DETAILED DESCRIPTION OF THE INVENTION

Figure 1:
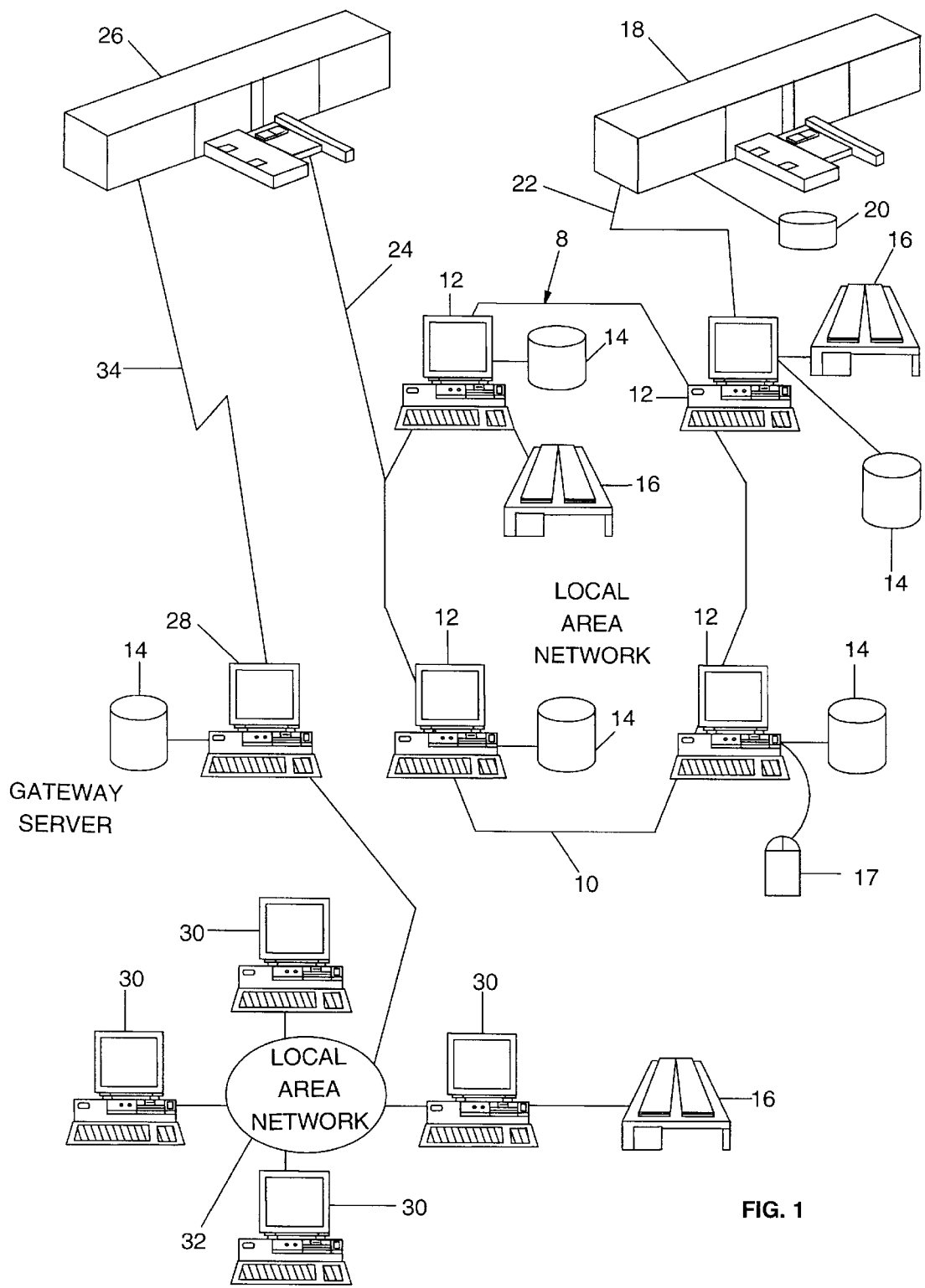
FIG. 1 is a pictorial representation of a data processing system which may be utilized to implement a method and system of the present invention.

Referring to FIG. 1, there is depicted a graphical representation of a data processing system 8, which may be utilized to implement the present invention. As may be seen, data processing system 8 may include a plurality of networks, such as Local Area Networks (LAN) 10 and 32, each of which preferably includes a plurality of individual computers 12 and 30, respectively. Of course, those skilled in the art will appreciate that a plurality of Intelligent Work Stations (IWS) coupled to a host processor may be utilized for each such network. Each said network may also consist of a plurality of processors coupled via a communications medium, such as shared memory, shared storage, or an interconnection network. As is common in such data processing systems, each individual computer may be coupled to a storage device 14 and/or a printer/output device 16 and may be provided with a pointing device such as a mouse 17.

The data processing system 8 may also include multiple mainframe computers, such as mainframe computer 18, which may be preferably coupled to LAN 10 by means of communications link 22. The mainframe computer 18 may also be coupled to a storage device 20 which may serve as remote storage for LAN 10. Similarly, LAN 10 may be coupled via communications link 24 through a sub-system control unit/communications controller 26 and communications link 34 to a gateway server 28. The gateway server 28 is preferably an IWS which serves to link LAN 32 to LAN 10.

With respect to LAN 32 and LAN 10, a plurality of documents or resource objects may be stored within storage device 20 and controlled by mainframe computer 18, as resource manager or library service for the resource objects thus stored. Of course, those skilled in the art will appreciate that mainframe computer 18 may be located a great geographic distance from LAN 10 and similarly, LAN 10 may be located a substantial distance from LAN 32. For example, LAN 32 may be located in California while LAN 10 may be located within North Carolina and mainframe computer 18 may be located in New York.

Software program code which employs the present invention is typically stored in the memory of a storage device 14 of a stand alone workstation or LAN server from which a developer may access the code for distribution purposes, the software program code may be embodied on any of a variety of known media for use with a data processing system such as a diskette or CD-ROM or may be distributed to users from a memory of one computer system over a network of some type to other computer systems for use by users of such other systems. Such techniques and methods for embodying software code on media and/or distributing software code are well-known and will not be further discussed herein.

Figure 2:
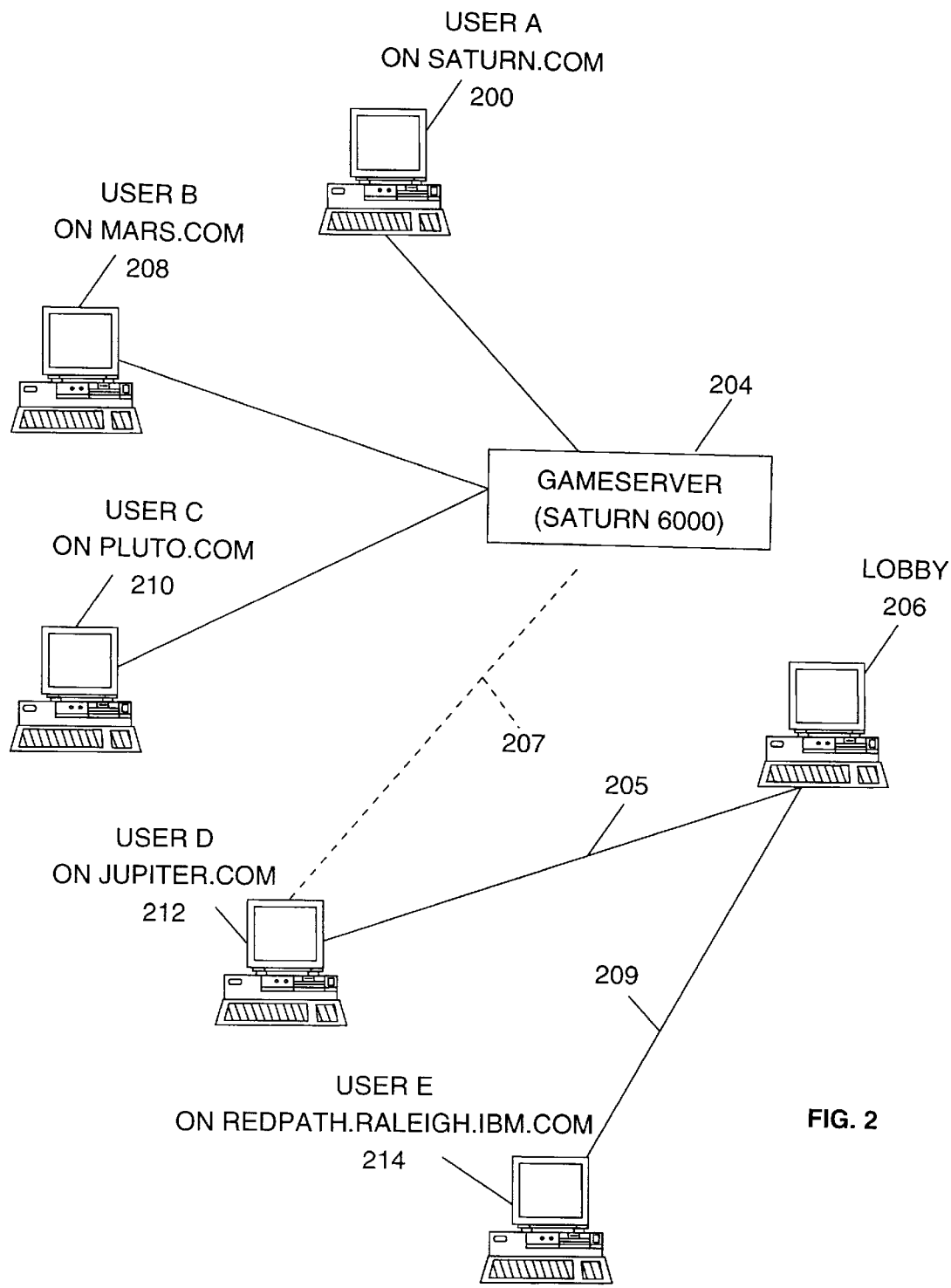
FIG. 2 is a diagram of a process for using a Lobby to join and post a created game.

Referring now to FIG. 2, a multi-user game environment on a network service has been established by UserA, generally identified by reference numeral 200. As shown in table 202, the unique name of the game is Rebels:865256358200. UserA 200 has created a game with a GameServer 204 on host Saturn.com which is posted at a Lobby 206. Other users join the game by connecting to the GameServer 204 on Saturn.com at port address 6000. This information is obtained from the Lobby 206 (via table 202). Three users are currently connected to the GameServer 204 at Saturn.com (UserA 200, UserB 208 and UserC 210). UserD 212 contacts the Lobby 206, as shown by line 205, to find out where the game is located and then joins the game, as shown by dotted line 207, making four users connected. UserE 214 creates a new game, as shown by line 209, which is posted at the Lobby 206 as game server redpath.raleigh.ibm.com at port 6000 under the unique game name redpath:865256367100, as shown in table 202.

Figure 3:
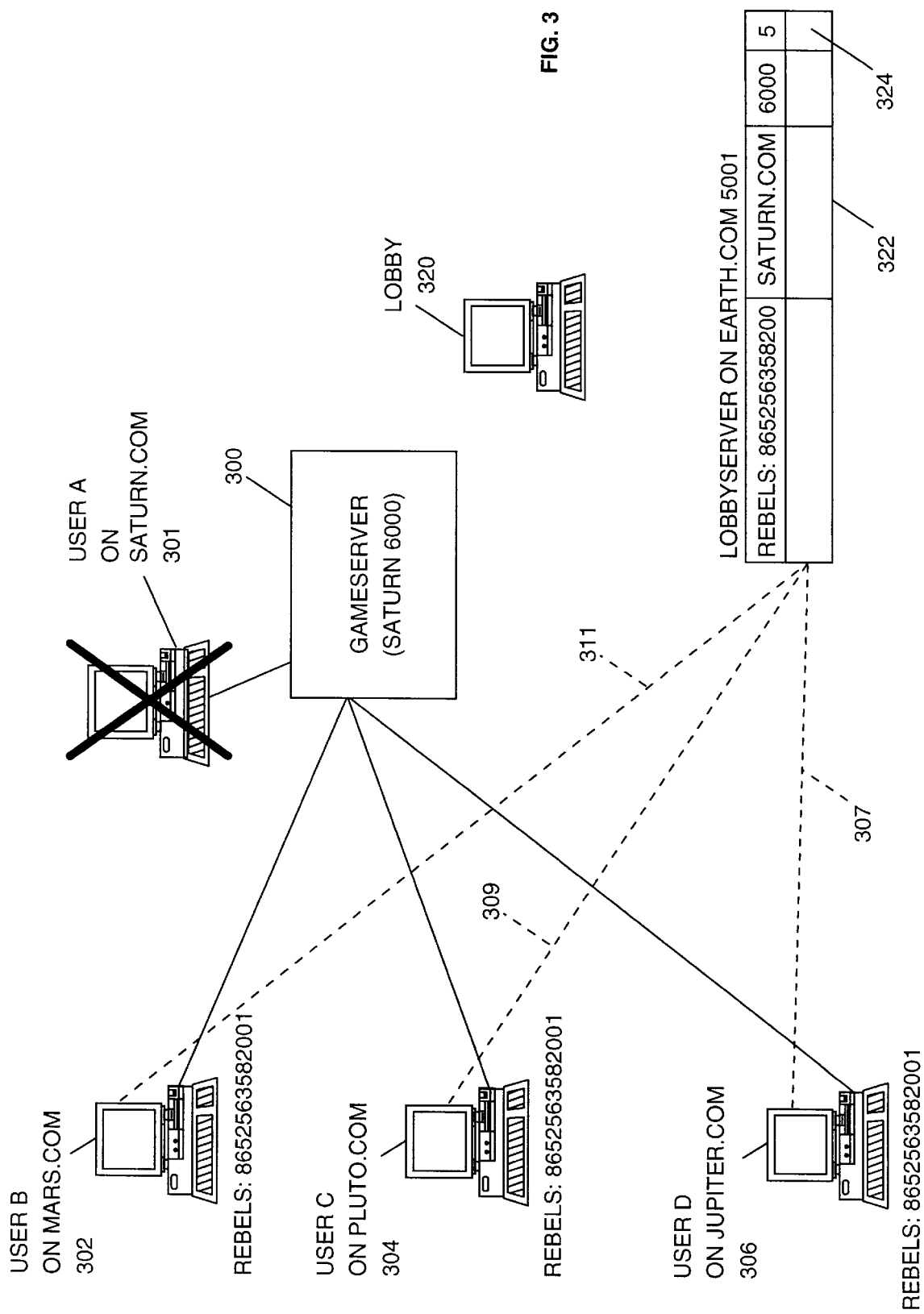
FIG. 3 is a diagram of a recovery process in accordance with the present invention.

Referring to FIG. 3 in which a multi-user game has been established. UserA 301 is terminated abruptly with GameServer 300. The cause of the termination with the GameServer 300 could be, for example, a service provider interruption or simply a power loss to the machine. Each remaining user 302, 304 and 306 realizes the connection has been broken to the GameServer 300. As a result, each user 302, 304 and 306 generates a same new game unique name (Rebels:8652563582001) from a defined series to be posted at the lobby, as will be subsequently described with reference to FIG. 5. This defined series is a process uniformly followed by each client so as to assure that the new game unique name is the same by each user when contacting the Lobby. At Lobby 320 the request from each user to recreate the game is processed, with the first user to make contact with the Lobby 320 to create the new game unique name posting. If the new game unique name does not exist in a table 322, the new game unique name is created as an entry in the table 322 for the first user. In this table entry the host address and port address of the contacting user is recorded. This information is encapsulated as the game descriptor. The game descriptor is always returned to the contacting user. If the new game unique name is found, the game descriptor is simply returned to notify the user of the game server location to join.

In the example shown in FIG. 3, the first user to contact the Lobby 320 is UserD 306, as shown by dotted line 307. In table 322, the game unique name (Rebels:8652563582001) is not found. As a result, table 322 is updated with the new game unique name, host Jupiter.com and port address 6000 on line 324 thereof The game descriptor is returned to UserD 306 to notify him that he is now the game server. In addition, UserB 302 and UserC 304 have subsequently made contact with the Lobby 320 and the new game unique name is now found on line 324 of table 322. The game descriptor is returned to these users via connect lines 309 and 311 which indicates they may rejoin the game at UserD 306.

Referring to FIG. 4, one example of a flowchart for a game unique name defined series generation is shown. A game unique name string is given at block 500. At block 510, a new unique name is created by concatenating the name given in block 500 with a numeral 1. This process is repeated each time to create a uniform series of new game unique names. Although not shown, it is to be understood that the series may be created in any fashion in order to maintain uniformity and may even reuse the original game unique name if the lobby has a posting expiration time.

Referring to FIG. 5 a flowchart illustrates the present invention. At block 400 the game server terminates abruptly. At block 410 a client player (user) realizes the connection has been terminated to the game server and generates a game unique name based on the original name of the game that was in play through the game server at the time of abrupt termination (see FIG. 4). The client then contacts the lobby. It is determined at decision block 420 whether or not the new game unique name exists at the lobby. If the response to decision block 420 is yes, then at block 460 the game descriptor for the game at the lobby is returned to the client player. At block 470 the client player joins the game by connecting to the game server address indicated in the game descriptor. The client player makes reasonable attempts (as defined by a network system timeout) to connect to the new game server since the new game server may be in the process of recreating the game.

It is then determined at decision block 480 whether or not the connection fails. If the connection to join the game fails, then the present invention returns to block 410 to generate the next new game unique name in the series. If the connection does not fail, the game continues play at block 450.

Returning to decision block 420, if the response thereto is no, then the lobby creates a game entry with the client player host address as game server and returns this game descriptor at block 430. At block 440 the client player realizes the game descriptor returned by the lobby indicates that the game server is to be created by the client player since the game server host address is the client's address. Therefore, the client creates the new game server and joins this new game server as a client player also. The game then continues to play at block 450. The end result is the continuation of the game with one of the previous client players taking over the server position. The original client who created the game server could later recover and peruse the Lobby to join the game again.

In addition, it is realized that a network partition could occur in the recovery process which would create subgroups of the game in operation. The game would then continue for those players in each subgroup. It is the prerogative of the client players who are playing the game to continue play with the number of client players that were able to reconnect.

Although the present invention has been described with respect to a specific preferred embodiment thereof, various changes and modifications may be suggested to one skilled in the art and it is intended that the present invention encompass such changes and modifications as fall within the scope of the appended claims.

I claim:

1. A method of using a lobby in a network service to recover from a game failure, comprising the steps of:

creating a consistent name series among a plurality of active players;

upon game failure, initiating a race to the lobby by said plurality of active players with a next game unique name from said consistent name series; and creating a recovery game server at a location of a first one of said plurality of active players to win said race to the lobby with remaining ones of said plurality of active players joining the game via said recovery game server.

2. The method of claim 1, further comprising the step of:

posting said recovery game server at the lobby.

3. The method of claim 1, further comprising the step of:

upon failing to join the game subsequent to said step of creating a recovery game server said remaining ones of said plurality of active players racing to the lobby with a next new game name.

4. A system for using a lobby in a network service to recover from a game failure, comprising:

means for creating a consistent name series among a plurality of active players;

upon game failure, means for initiating a race to the lobby by said plurality of active players with a next game unique name from said consistent name series; and means for creating a recovery game server at a location of a first one of said plurality of active players to win said race to the lobby with remaining ones of said plurality of active players joining the game via said recovery game server.

5. The system of claim 4, further comprising:

means for posting said recovery game server at the lobby.

6. The system of claim 4, further comprising:

upon failing to join the game subsequent to said means for creating a recovery game server, means for said remaining ones of said plurality of active players to race to the lobby with a next new game name.

7. A computer program product recorded on computer readable medium for using a lobby in a network service to recover from a game failure, said product being executable on a computer and comprising:

computer readable means for creating a consistent name series among a plurality of active players;

upon game failure, computer readable means for initiating a race to the lobby by said plurality of active players with a next game unique name from said consistent name series; and computer readable means for creating a recovery game server at a location of a first one of said plurality of active players to win said race to the lobby with remaining ones of said plurality of active players joining the game via said recovery game server.

8. The program product of claim 7, further comprising:
computer readable means for posting said recovery game server at the lobby.

9. The program product of claim 7, further comprising:
upon failing to join the game subsequent to creating a recovery game server, computer readable means for said remaining ones of said plurality of active players to race to the lobby with a next new game name.

\* \* \* \* \*

Disclaimer

5,984,787—Richard J. Redpath, Cary, N.C. METHOD AND SYSTEM FOR MULTI- USER GAME RECOVERY Patent dated Nov. 16, 1999. Disclaimer filed Oct 4, 2006, by the assignee, International Business Machines Corporation.

Hereby enter this disclaimer to all claims, of said patent.

*(Official Gazette, January 9, 2007)*